(12) United States Patent
Xiang et al.

(10) Patent No.: US 10,105,676 B2
(45) Date of Patent: Oct. 23, 2018

(54) START-UP SYSTEM FOR STARTING REFORMING HYDROGEN PRODUCTION DEVICE

(71) Applicant: GUANGDONG HYDROGEN ENERGY SCIENCE AND TECHNOLOGY CO., LTD, Dongguan (CN)

(72) Inventors: Hua Xiang, Dongguan (CN); Wenxia Li, Dongguan (CN); Jin Ma, Dongguan (CN); Rong Cai, Dongguan (CN); Jianlin Lei, Dongguan (CN); Weitao Yang, Dongguan (CN); Wanguang Liang, Dongguan (CN); Yongfeng Ma, Dongguan (CN)

(*) Notice: Subject to any disclaimer, the term of this patent is extended or adjusted under 35 U.S.C. 154(b) by 57 days.

(21) Appl. No.: 15/446,000

(22) Filed: Mar. 1, 2017

(65) Prior Publication Data

US 2017/0173554 A1 Jun. 22, 2017

Related U.S. Application Data

(63) Continuation of application No. PCT/CN2016/085781, filed on Jun. 15, 2016.

(30) Foreign Application Priority Data

Aug. 6, 2015 (CN) .......................... 2015 1 0476323

(51) Int. Cl.
*B01J 19/24* (2006.01)
*C01B 3/16* (2006.01)
(Continued)

(52) U.S. Cl.
CPC .............. *B01J 19/245* (2013.01); *C01B 3/16* (2013.01); *C01B 3/323* (2013.01);
(Continued)

(58) Field of Classification Search
CPC combination set(s) only.
See application file for complete search history.

(56) References Cited

U.S. PATENT DOCUMENTS 1,512,247 A * 10/1924 Smith .................... F23D 11/08
239/110
1,722,504 A * 7/1929 Morris .................... F23D 11/00
431/11
(Continued)

FOREIGN PATENT DOCUMENTS

CN 2439629 Y 7/2001
CN 1311291 A 9/2001
(Continued)

*Primary Examiner* — Kaity V Chandler
(74) *Attorney, Agent, or Firm* — Wayne & Ken, LLC; Tony Hom

(57) ABSTRACT

The invention discloses a start-up system for starting reforming hydrogen production device, the reforming hydrogen production device and the start-up system adopt methanol-water mixture as feedstock, comprising a feed riser pipe, a flame tray, an upper cover body and an igniter. The flame tray and the upper cover body are disposed on the feed riser pipe from the bottom up; the middle part of the upper cover body is provided with an aperture in communication with the feed riser pipe, the methanol-water mixture feedstock may flow from the feed riser pipe up to the aperture and be exuded from the aperture and spread around along the upper side surface of the upper cover body until flowing into the flame tray. The present invention has high ignition success rate, large methanol-water mixture burning areas and combustion flame, and can quickly restart the reforming hydrogen production device.

5 Claims, 21 Drawing Sheets

(51) Int. Cl.
*C01B 3/32* (2006.01)
*F23D 1/00* (2006.01)
*F23C 6/04* (2006.01)
*F23K 3/02* (2006.01)

(52) U.S. Cl.
CPC ......... *C01B 2203/0227* (2013.01); *C01B 2203/0233* (2013.01); *C01B 2203/0283* (2013.01); *C01B 2203/066* (2013.01); *C01B 2203/0816* (2013.01); *C01B 2203/1223* (2013.01); *C01B 2203/1604* (2013.01)

(56) References Cited

U.S. PATENT DOCUMENTS

| | | | | |
|---|---|---|---|---|
| 2,517,015 A | * | 8/1950 | Mock | F23D 11/00 60/748 |
| 2,734,560 A | * | 2/1956 | Harris et al. | F23C 99/00 431/263 |
| 3,093,185 A | * | 6/1963 | Lowry | F23D 5/02 431/116 |
| 3,319,692 A | * | 5/1967 | Imants | F23C 9/00 239/DIG. 7 |
| 4,006,589 A | * | 2/1977 | Schirmer | F23C 6/045 60/39.23 |
| 4,087,963 A | * | 5/1978 | Schirmer | F23C 6/045 431/352 |
| 4,701,123 A | * | 10/1987 | Tallman | F23D 14/84 126/116 R |
| 5,085,579 A | * | 2/1992 | Moore, Jr. | F23D 14/36 122/18.3 |
| 5,993,197 A | * | 11/1999 | Alber | F23D 3/40 29/890.02 |
| 7,273,366 B1 | * | 9/2007 | Sujata | F23C 6/045 431/12 |
| 2010/0282238 A1 | * | 11/2010 | He | F24C 3/085 126/39 E |
| 2011/0239539 A1 | * | 10/2011 | Gatt | F23D 3/02 48/61 |
| 2013/0306181 A1 | * | 11/2013 | Mitchell | F23L 15/04 137/888 |
| 2015/0204223 A1 | * | 7/2015 | Tsumagari | F01N 3/025 239/405 |
| 2017/0082291 A1 | * | 3/2017 | Horikawa | F23R 3/18 |

FOREIGN PATENT DOCUMENTS

| | | |
|---|---|---|
| CN | 2864410 Y | 1/2007 |
| CN | 202057023 U | 11/2011 |
| CN | 202581445 U | 12/2012 |
| CN | 203177241 U | 9/2013 |
| CN | 204185238 U | 3/2015 |
| CN | 105060247 A | 11/2015 |
| CN | 204917952 U | 12/2015 |

* cited by examiner

START-UP SYSTEM FOR STARTING REFORMING HYDROGEN PRODUCTION DEVICE

CROSS-REFERENCE TO RELATED APPLICATIONS

This application is a continuation of International Patent Application No. PCT/CN2016/085781 with a filing date of Jun. 15, 2016, designating the United States, now pending, and further claims priority to Chinese Patent Application No. 201510476323.2 with a filing date of Aug. 6, 2015. The content of the aforementioned application, including any intervening amendments thereto, are incorporated herein by reference.

TECHNICAL FIELD

The present invention relates to the technical field of methanol-water mixture reforming hydrogen production device, and particularly relates to a start-up system for starting reforming hydrogen production device.

BACKGROUND OF THE PRESENT INVENTION

Hydrogen is one of the most desirable energy in the 21st century. Hydrogen produces the most energy during combustion of the same weight of coal, gasoline and hydrogen, and the product of combustion of hydrogen is water without ash and waste gas, and therefore will not pollute the environment; while the main products of combustion of coal and oil are CO2 and SO2, which may cause greenhouse effect and acid rain. Reserves of oil and coal are limited, but hydrogen mainly exists in water, and the only product after combustion is also water, so that hydrogen can be generated continuously and will never run out. Hydrogen is widely distributed, and water is a large "warehouse" of hydrogen and contains 11% hydrogen. Soil contains about 1.5% hydrogen; and oil, coal, natural gas, animals, plants and the like all contain hydrogen. Hydrogen mainly exists in a form of a compound of water, about 70% of the Earth's surface is covered with water, and water storage capacity is large; therefore it can be said that hydrogen is "inexhaustible" energy. If hydrogen can be produced in a suitable way, then hydrogen will also be relatively cheap energy.

At present, the methanol steam reforming technology is used to produce a gas mixture of H2 and CO2, then the gas mixture may be separated by a palladium membrane separator to obtain H2 and CO2 respectively. With reference to Chinese invention application 201310340475.0 (applicant: Shanghai Hydrogen Mobile Reformer Instrument. Co., Ltd), the patent discloses a methanol-water mixture hydrogen production system in which methanol and water steam in the reforming chamber of the reformer pass through catalysts at the temperature of 350-409° C. and at the pressure condition of 1-5 MPa, and under the action of the catalysts, methanol cracking reaction and carbon monoxide shift reaction occur to generate hydrogen and carbon dioxide, and this is a gas-solid catalytic reaction system involving multiple components and multiple reactions, with reaction equations as follows:

$$CH_3OH \rightarrow CO + 2H_2; \quad (1)$$

$$H_2O + CO \rightarrow CO_2 + H_2; \quad (2)$$

and $$CH_3OH + H_2O \rightarrow CO_2 + 3H_2, \quad (3)$$

H2 and CO2 generated from reactions are reformed, and then separated through the palladium membrane of a separation chamber to obtain high purity hydrogen.

The catalytic reaction of the methanol-water mixture is completed in the reforming hydrogen production device of the methanol-water mixture hydrogen production device, the reforming hydrogen production device comprises a reformer shell and the combustion chamber and reforming chamber that are positioned in the shell of the reforming hydrogen production device, typically, the reforming hydrogen production device can only function well when the reforming chamber has temperatures of 350-409° C., while the combustion chamber has temperatures of 405-570° C. The start-up of the reforming hydrogen production device is completed by the start-up device, in the prior art, cold start-up usually takes a long time which typically is above 5 hours, while warm start-up needs to consume intensive energy until the device such as the reforming chamber reaches high temperatures.

Because of this, the author applied for an invention patent CN201410621689.X on Nov. 7, 2014, this invention patent discloses a reformer of methanol-water mixture hydrogen production system, one end of the reformer is provided with a start-up device, the device comprises a cup holder, the cup holder is provided with a feedstock input pipeline, a heating vaporization pipeline, an ignition device and a temperature detection device; the feedstock input pipeline is in communication with the heating vaporization pipeline, the feedstock enters the heating vaporization pipeline by the feedstock input pipeline, and then to output from the end of the heating vaporization pipeline; the position of the ignition device corresponds to the end of the heating vaporization pipeline for ignition over the feedstock output in the heating vaporization pipeline, the feedstock combusts after ignition by the ignition device, which can heat the heating vaporization pipeline to gasify the feedstock in the heating vaporization pipeline, rapidly increase combustion strength and further increase temperature of the reformer. The start-up device usually can restart the reformer (i. e. the reforming hydrogen production device) in 5 minutes without use of an electrical heating device. However, the start-up device has following drawbacks: first, the ignition success rate of the ignition device is hard to be guaranteed, since the methanol-water mixture feedstock is output from the heating vaporization pipeline, and typically output by way of dripping, methanol-water mixture often does not touch the ignition device in the dripping process, which often causes ignition failure, and a re-ignition is needed; second, since the diameter of the cup holder is smaller, and the cup holder cannot open vent holes so that the methanol-water mixture burning areas of the start-up device become smaller, and the flame is not sufficient large; third, the methanol-water mixture feedstock in the heating vaporization pipeline cannot be gasified under the conditions of a rapid flow rate, therefor, methanol-water mixture feedstock with a slower flow rate can only be delivered to the start-up device, which further affects methanol-water mixture feedstock combustion strength and increases the start-up time of the reformer.

SUMMARY OF PRESENT INVENTION

The present invention intends to solve technical problems against the deficiency of the above-mentioned prior art and provide a start-up device able to quickly start reforming hydrogen production device with a high success rate of ignition, large methanol-water mixture burning areas and combustion flame.

In order to solve the above-mentioned technical problems, the technical solutions of the present invention are that: a start-up system for starting reforming hydrogen production device, the reforming hydrogen production device and the start-up system adopt methanol as feedstock, and include a feed riser pipe, a flame tray, an upper cover body and an igniter, the flame tray and the upper cover body are disposed on the feed riser pipe from the bottom up; the middle part of the upper cover body is provided with an aperture in communication with the feed riser pipe, the methanol-water mixture feedstock may flow from the feed riser pipe up to the aperture and be exuded from the aperture and spread around along the upper side surface of the upper cover body until flowing into the flame tray; and an ignition position of the igniter corresponds to the upper side surface of the upper cover body.

As further illustration for the present invention:

a lower cover body is further provided between the flame tray and the upper cover body, wherein the lower cover body is mounted on the feed riser pipe, and may prevent the methanol-water mixture feedstock in the flame tray from sputtering outwardly:

a plurality of evenly arranged vent holes are disposed on the periphery of the flame tray, so that external air enters though the vent holes into the flame tray and the reforming hydrogen production device. Further, the vent holes of the flame tray are spiral vent hole grooves;

the air inlet device is provided below the flame tray, the air inlet device comprises an air inlet channel and a blower, the blower blows external air into the air inlet channel and then into the flame tray and the reforming hydrogen production device.

The advantageous effects of the present invention are that: the flame tray and the upper cover body of the present invention are provided on the feed riser pipe from bottom up; the middle part of the upper cover body is provided with an aperture in communication with the feed riser pipe, methanol-water mixture feedstock may flow up to the aperture from the feed riser pipe and be exuded from the aperture and spread around along the upper side surface of the upper cover body until flowing into the flame tray, an ignition position of the igniter corresponds to the upper side surface of the upper cover body. Therefore, in one aspect, compared with the ignition way of igniting dripped methanol-water mixture feedstock by an igniter, it is easier to ignite methanol-water mixture feedstock spread on the upper cover body, so that the success rate of the igniter is high. In another aspect, since the usual areas of the flame tray is large, the flame tray is easy to open vent holes, so that the methanol-water mixture burning areas of the start-up device as well as the flame are large. In yet another aspect, after successful ignition, since the methanol-water mixture feedstock is exuded from the aperture and spread around along the upper side of the upper cover body until flowing into the flame tray, heat release from combustion can be realized without need for gasification first through the heating vaporization pipeline in the whole flowing process of the methanol-water mixture feedstock, so that methanol-water mixture feedstock with a higher flowing rate can be transported to the start-up device to greatly enhance the combustion strength and the start-up time of the reforming hydrogen production device.

DETAILED DESCRIPTION OF PREFERRED EMBODIMENTS

The structure principle and working principle of the present invention are described below in further detail with reference to the drawings.

The present invention is used to start the start-up system of the reforming hydrogen production device for being applied to a methanol-water mixture reforming hydrogen production generator.

Figure 6:
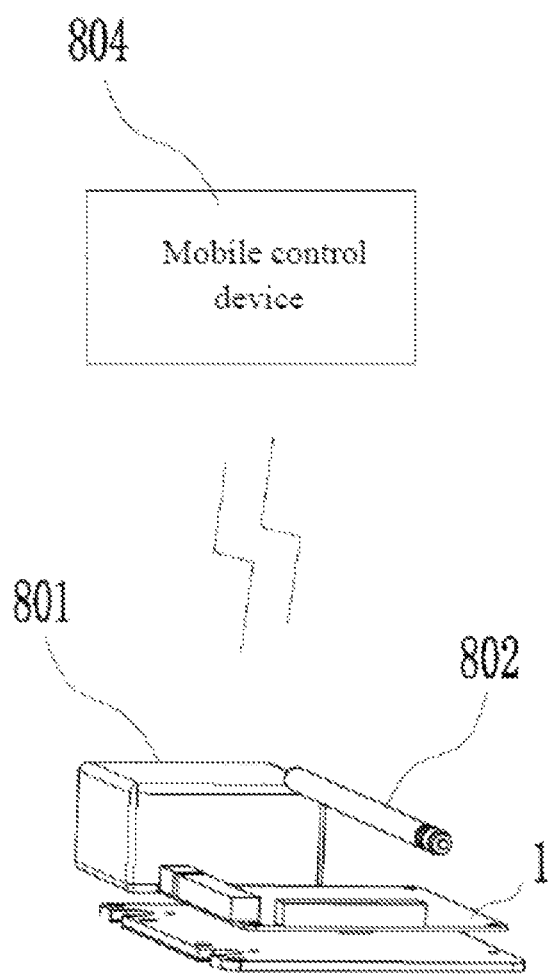
FIG. 6 is a schematic view of wireless connection between a wireless signal transmitting and receiving device and a mobile control device.
Figure 7:
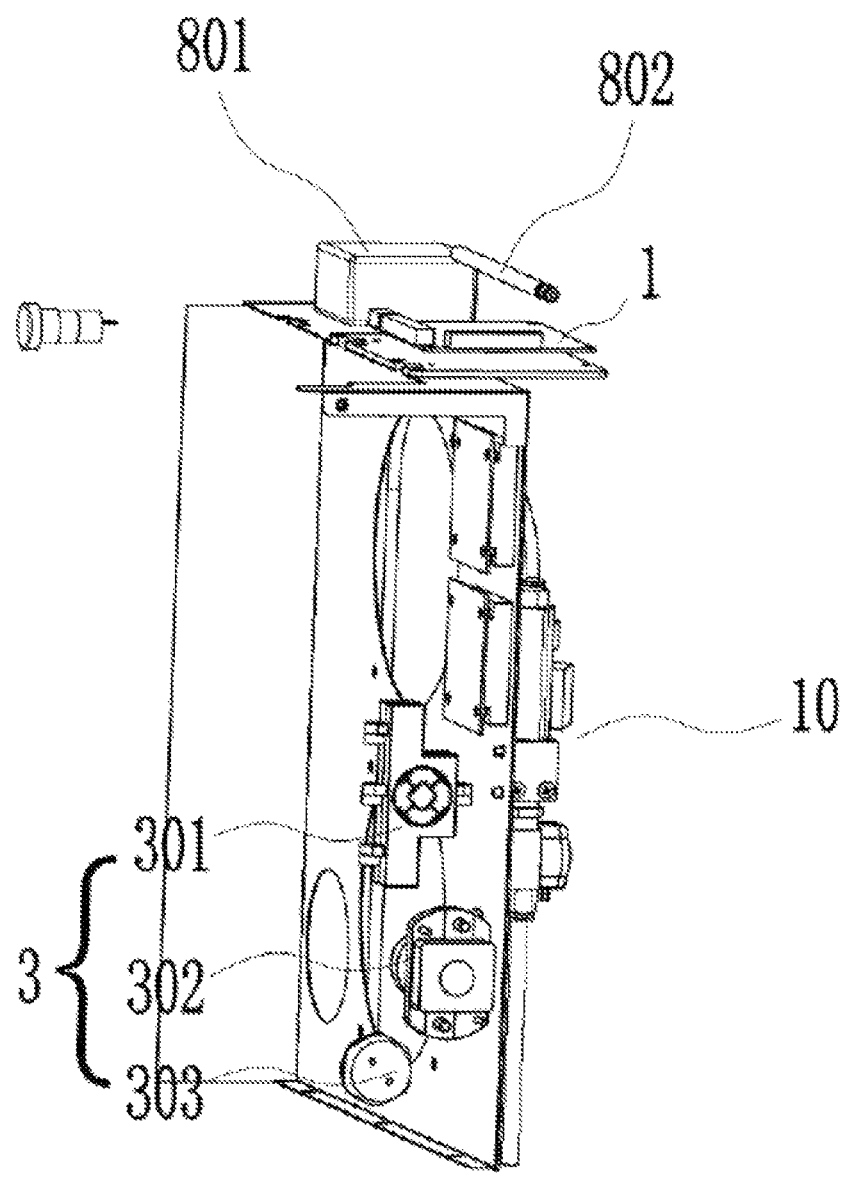
FIG. 7 is a schematic view of a mounting structure of an electronic control system and a gas control system.
Figure 8:
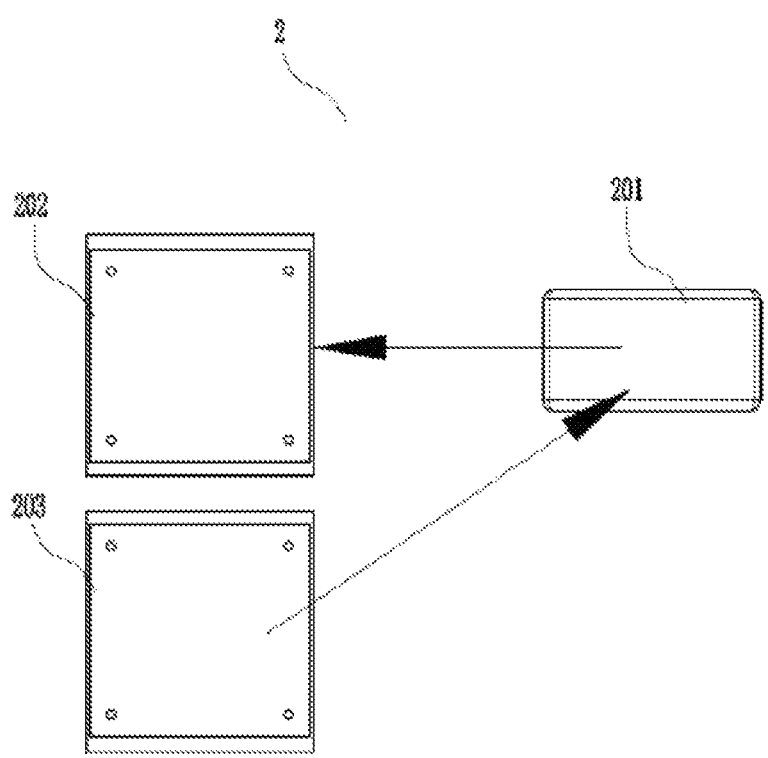
FIG. 8 is a schematic view of charging and discharging between a rechargeable battery and a first power supply module and a second power supply module.
Figure 9:
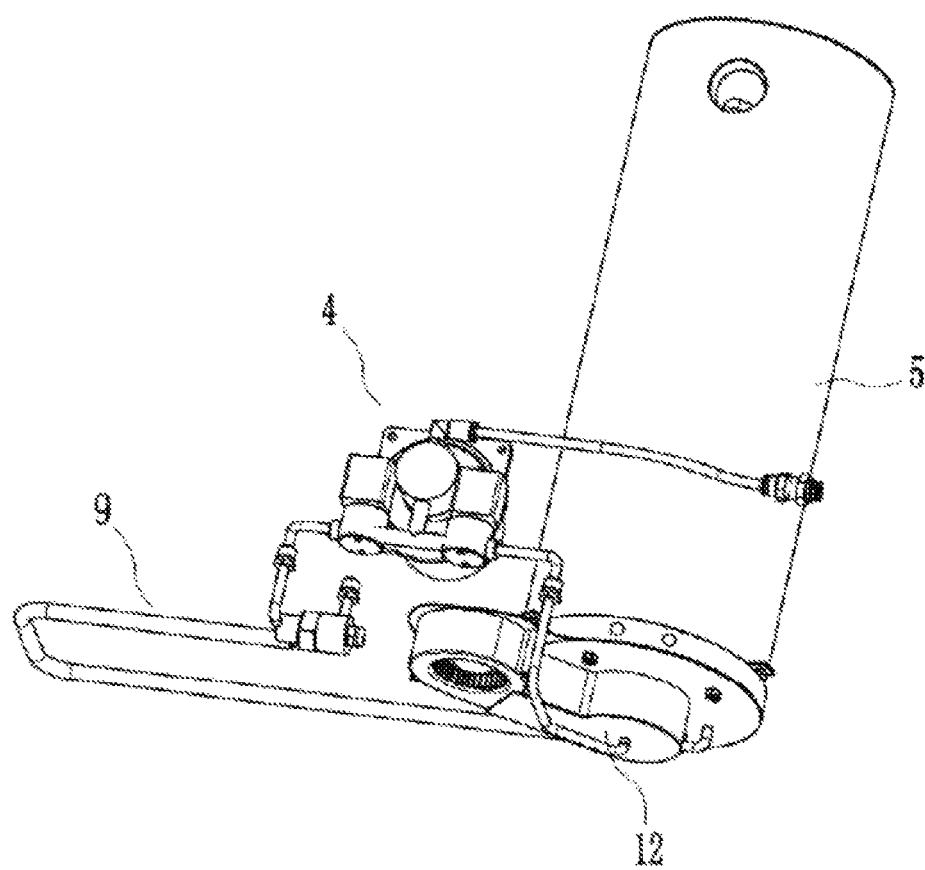
FIG. 9 is a schematic view of a stereostructure of a hydrogen production system, a methanol-water mixture feed system and a heat exchange system.
Figure 10:
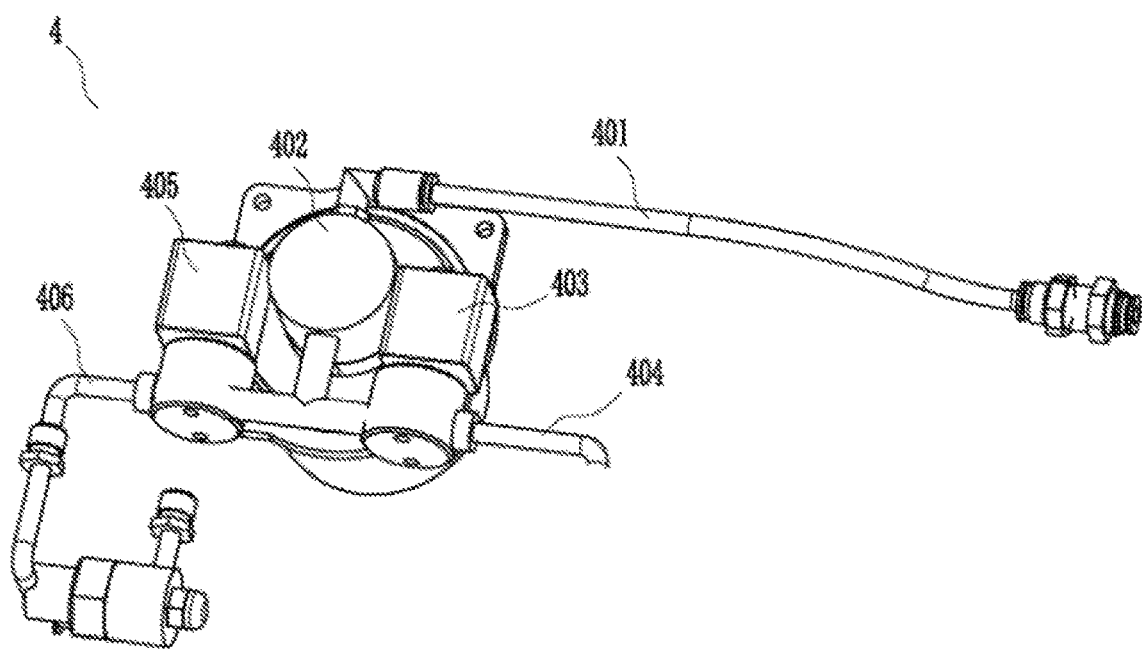
FIG. 10 is a schematic view of a stereostructure of a methanol-water mixture feed system.
Figure 11:
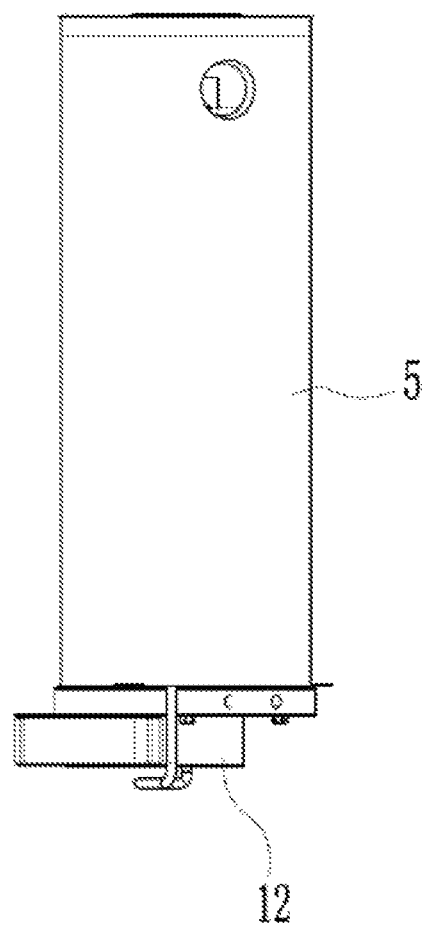
FIG. 11 is a front view of a hydrogen production system.
Figure 12:
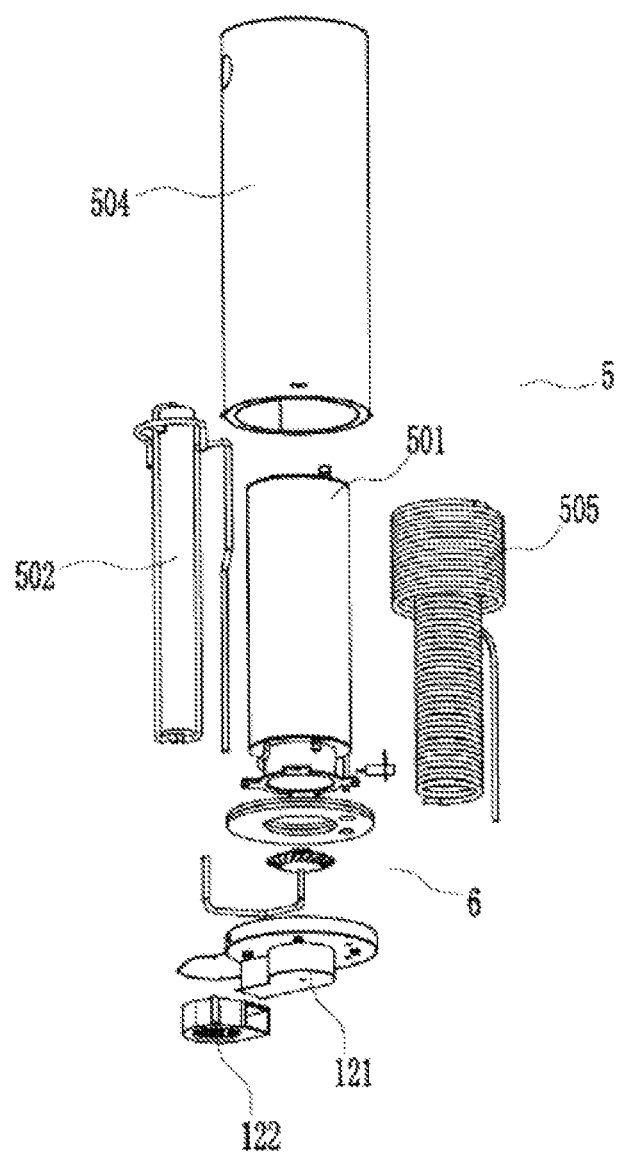
FIG. 12 is a schematic view of a dispersion structure of a hydrogen production system.
Figure 13:
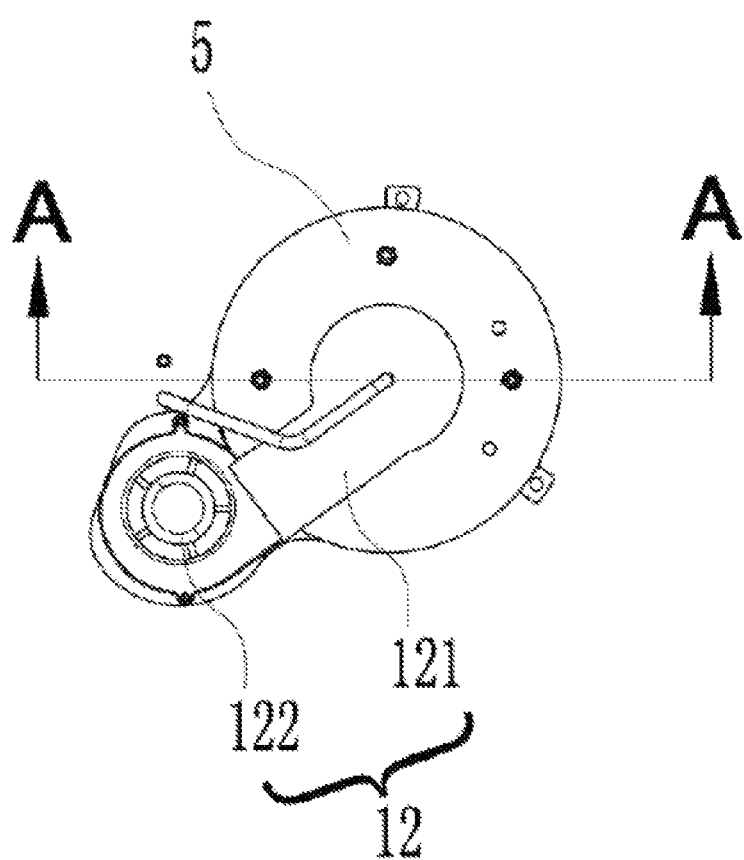
FIG. 13 is a bottom view of a hydrogen production system.
Figure 14:
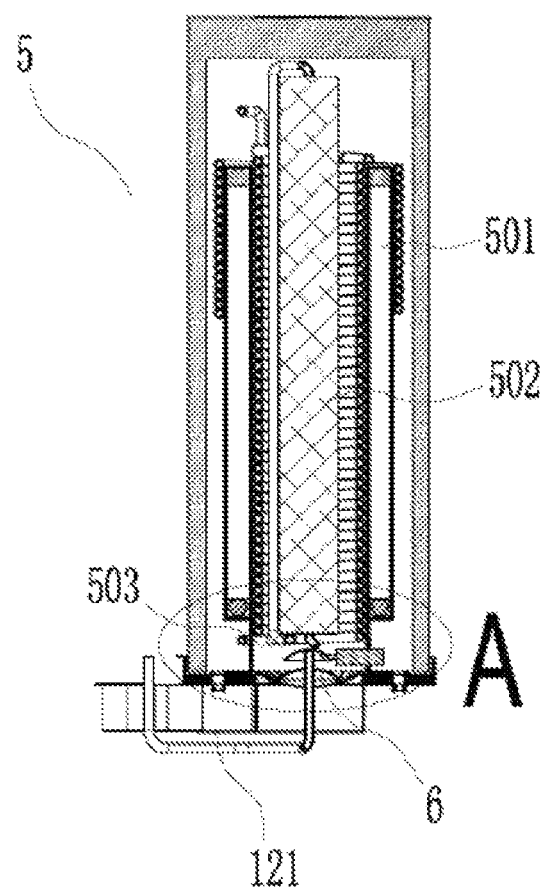
FIG. 14 is a sectional view along a line A-A in FIG. 13.
Figure 15:
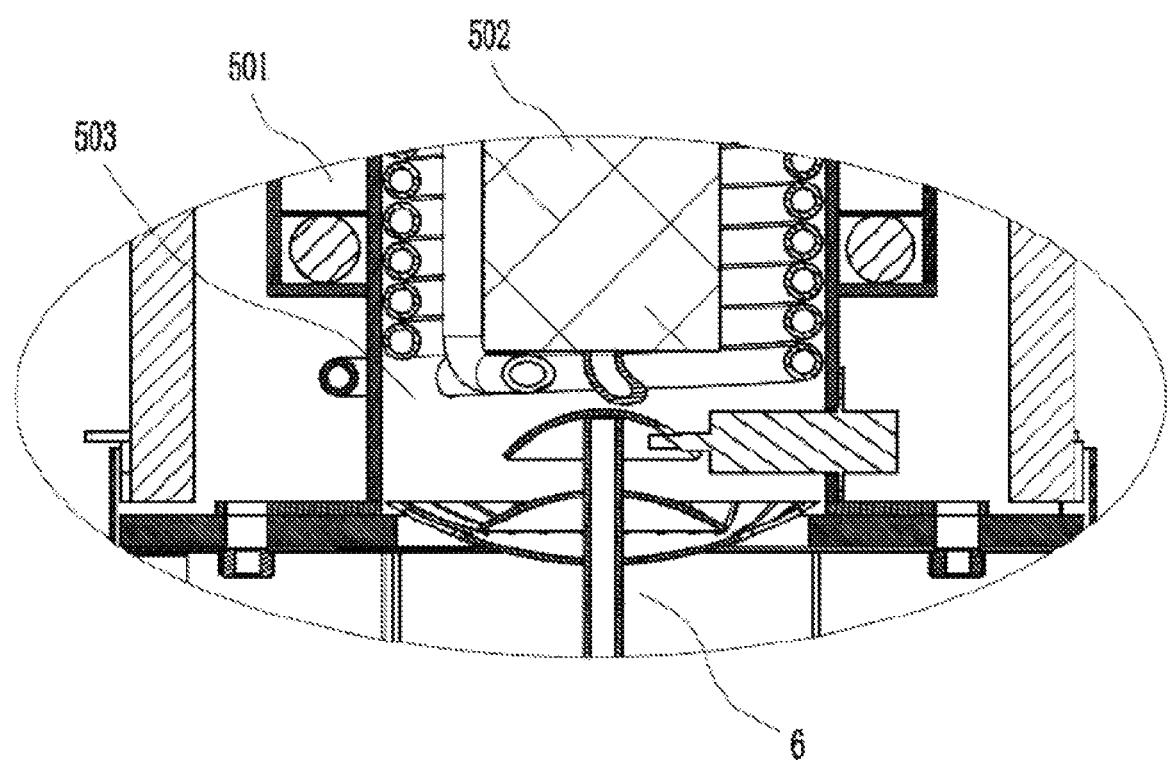
FIG. 15 is an enlarged view of a part A in FIG. 14.

As shown in FIGS. 1-5, a methanol-water mixture reforming hydrogen production generator includes an electronic control system, a methanol-water mixture feed system, a hydrogen production system and a power generation system, wherein:

the electronic control system, with reference to FIGS. 6-8, includes a control mainboard 1, a power supply device 2 and a power output port 3, and the control mainboard controls operations of the methanol-water mixture feed system, the hydrogen production system and the power generation system; the power supply device 2 includes a rechargeable battery 201, and in the start-up process of the methanol-water mixture reforming hydrogen production generator, the rechargeable battery 201 supplies power to the methanol-water mixture reforming hydrogen production generator itself when a start-up button 11 is pressed, specifically, the rechargeable battery 201 mainly supplies power to the control mainboard 1, a transfer pump 402, a start-up feed solenoid valve 403, a hydrogen production feed solenoid valve 405 and a start-up device 6; after the methanol-water mixture reforming hydrogen production generator is started, the rechargeable battery 201 stops supplying power to the methanol-water mixture reforming hydrogen production generator itself, except a safety solenoid valve 102; the power output port 3 is used for outputting power to the outside by the power generation system; the power output port 3 includes a current sensor 301, a DC contactor 302 and an aeronautical connector 303, wherein the current sensor 301 is electrically connected with the control mainboard 1, the aeronautical connector 303 outputs 48V DC to the outside, and certainly may also output DC with other specific values as needed;

the methanol-water mixture feed system 4, with reference to FIGS. 9-10, includes a main feed pipe 401, the transfer pump 402, the start-up feed solenoid valve 403, a start-up feed branch pipe 404, the hydrogen production feed solenoid valve 405 and a hydrogen production feed branch pipe 406; in the start-up process of the methanol-water mixture reforming hydrogen production generator, the start-up feed solenoid valve 403 is opened and the hydrogen production feed solenoid valve 405 is closed, and methanol-water mixture feedstock is fed through the main feed pipe 401, the transfer pump 402, the start-up feed solenoid valve 403 and the start-up feed branch pipe 404 successively and supplied to the start-up device 6 of the hydrogen production system; in the hydrogen production process of the methanol-water mixture reforming hydrogen production generator, the hydrogen production feed solenoid valve 405 is opened and the start-up feed solenoid valve 404 is closed, and methanol-water mixture feedstock is fed through the main feed pipe 401, the transfer pump 402, the hydrogen production feed solenoid valve 405 and the hydrogen production feed branch pipe 406 successively and supplied to a reforming hydrogen production device 5 of the hydrogen production system;

the hydrogen production system, with reference to FIG. 9 and FIGS. 11-15, includes the reforming hydrogen production device 5 and the start-up device 6, wherein the reforming hydrogen production device 5 includes a heat insulated housing 504, a reforming chamber 501, a separation chamber 502 and a combustion chamber 503 are disposed in the heat insulated housing 504, the reforming chamber 501 is used for producing a gas mixture with carbon dioxide and hydrogen as major components when reforming hydrogen production reaction occurs on methanol and water, the reforming chamber 501 is provided with a catalyst, methanol and water steam in the reforming chamber 501 pass through the catalyst under a pressure of 1-5 MPa, and under the action of the catalyst, methanol cracking reaction and carbon monoxide shift reaction occur, to generate hydrogen and carbon dioxide, and this is a gas-solid catalytic reaction system involving multiple components and multiple reactions, with reaction equations as follows:

$$CH_3OH \rightarrow CO + 2H_2; \quad (1)$$

$$H_2O + CO \rightarrow CO_2 + H_2; \quad (2)$$

$$CH_3OH + H_2O \rightarrow CO_2 + 3H_2, \quad (3)$$

a gas mixture with high-temperature containing carbon dioxide and hydrogen as major components is obtained; the separation chamber 502 is used for separating hydrogen from the gas mixture, the hydrogen may be output to the outside or supplied to a fuel cell 7, and the combustion chamber 503 is used for combusting a part of the produced hydrogen in the combustion chamber 503 to provide heat for the operation of the reforming hydrogen production device 5; the start-up device 6 is used in the start-up process of the methanol-water mixture reforming hydrogen production generator, to provide heat for the start-up process of the reforming hydrogen production device 5 through the fuel methanol-water mixture feedstock; and in addition, the reforming hydrogen production device 5 is further provided with heating vaporization coiled tubes 505, methanol and water feedstock are first vaporized via the heating vaporization coiled tubes 505 before entering into the reforming chamber 501;

the power generation system includes the fuel cell 7 used for hydrogen and oxygen in the air to react electrochemically to produce electric energy, at the anode of the fuel cell 7: $2H_2 \rightarrow 4H^+ + 4e^-$, $H_2$ is split into two protons and two electrons, the protons pass through a proton exchange membrane (PEM), the electrons pass through an anode plate and enter into a cathode bipolar plate through an external load, and at the cathode of the fuel cell 7: $O_2 + 4e^- + 4H^+ \rightarrow 2H_2O$, the protons, the electrons, and $O_2$ are recombined to form $H_2O$; the produced electric energy is output through the power output port 6, and may also be used for charging the rechargeable battery 201. One side of the fuel cell is provided with two draught fans 701, and the other side is provided with an air filtering screen 702, under the driving of the two draught fans 701, external air enters into the fuel cell through the air filtering screen 702, and then is exhausted through the two draught fans 701. On the one hand, the external air cools the fuel cell T during the process of entering into the fuel cell 7, on the other hand, it provides oxygen for electrochemical reactions in the fuel cell 7.

As shown in FIGS. 1-7, the electronic control system is further provided with a wireless signal transmitting and receiving device 8, wherein the wireless signal transmitting and receiving device 8 includes a signal converter 801 and an antenna 802. The antenna 802 is mounted on the signal converter 801 and the signal converter 801 is electrically connected with the control mainboard 1. Further, the methanol-water mixture reforming hydrogen production generator further includes a mobile control device 804 which achieves wireless connection with the wireless signal transmitting and receiving device 8 by way of WIFI. The mobile control device 804 is provided with a display module for displaying data parameters and a control module for setting working procedure of the methanol-water mixture reforming hydrogen production generator. The mobile control device 804 is preferably a smart phone or a tablet computer. By setting the wireless signal transmitting and receiving device 8, the methanol-water mixture reforming hydrogen production generator can be wirelessly set and monitored by the external mobile control device 804.

As shown in FIGS. 1-3 and FIG. 8, the power supply device 2 further includes a first power supply module 202 and a second power supply module 203, in the start-up process of the methanol-water mixture reforming hydrogen production generator, the rechargeable battery 201 supplies power to the methanol-water mixture reforming hydrogen production generator itself by the first power supply module 202; and in the processes of hydrogen production and power generation of the methanol-water mixture reforming hydrogen production generator, the power generation system charges the rechargeable battery 201 by the second power supply module 203 and automatically stops the charging when the rechargeable battery 201 is fully charged. The rechargeable battery 201 is preferably a lithium-ion battery.

By setting the power supply device 2, the rechargeable battery can supply power to the methanol-water mixture reforming hydrogen production generator itself without the need of an external power supply during a start-up, and the rechargeable battery can be charged in turn after operation of the fuel cell is finished, so as to be ready for a next start-up.

Figure 16:
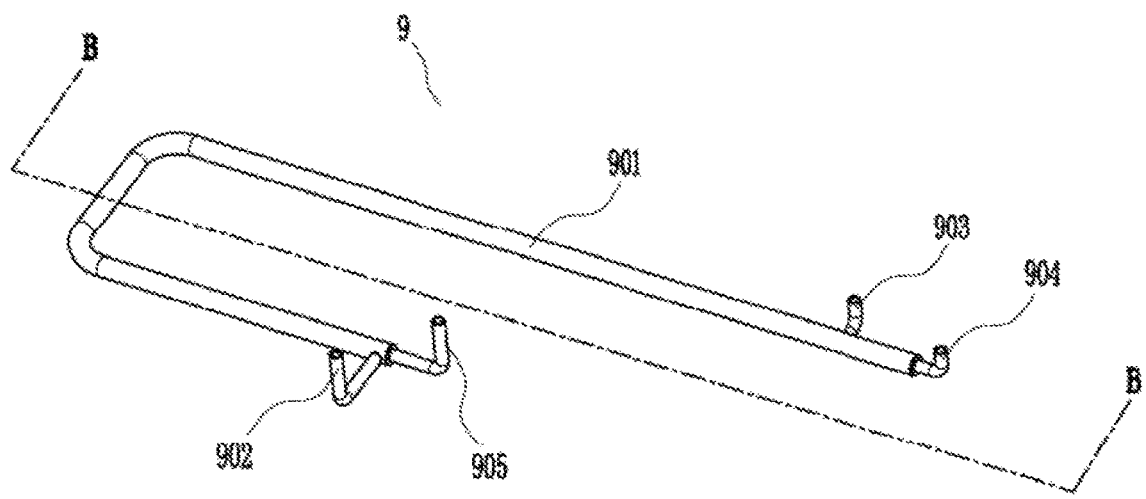
FIG. 16 is a schematic view of a stereostructure of a heat exchange system.
Figure 17:
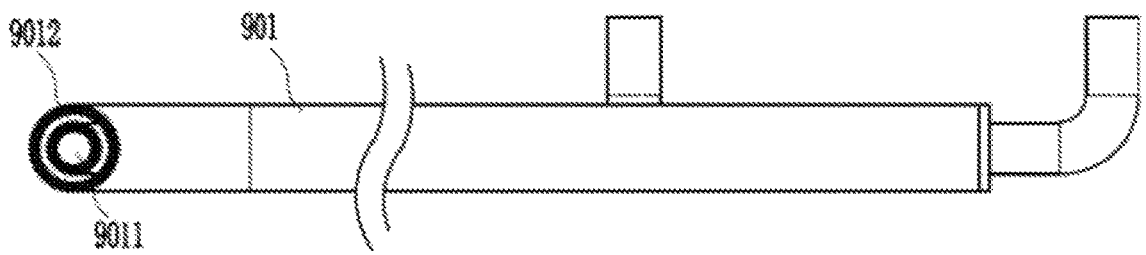
FIG. 17 is a sectional view along a line B-B in FIG. 16.
Figure 18:
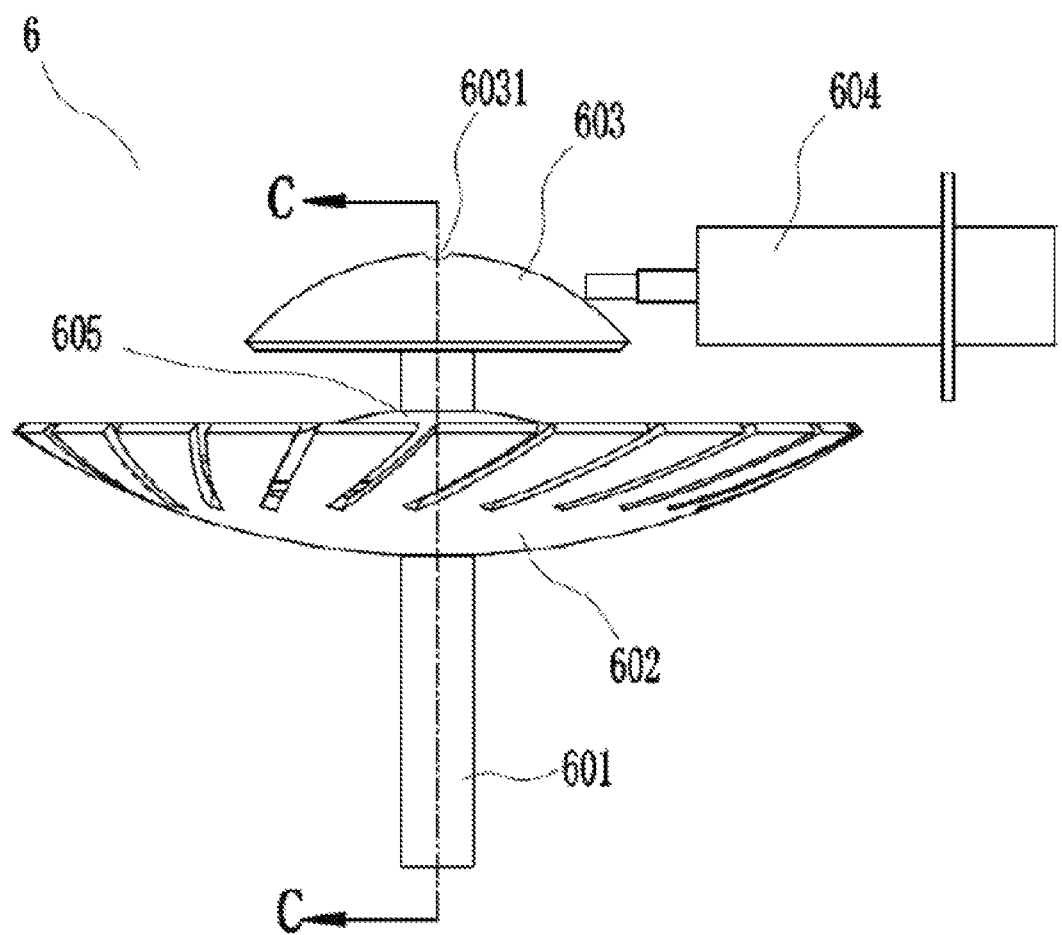
FIG. 18 is a front view of a start-up system.
Figure 19:
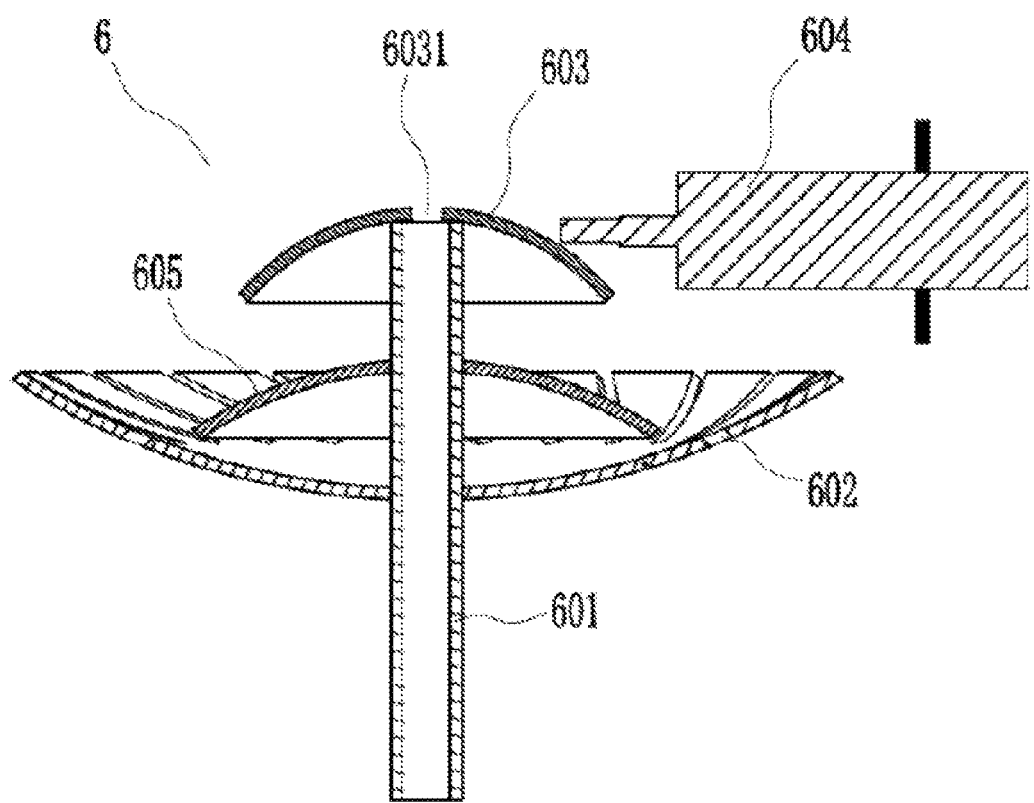
FIG. 19 is a sectional view along a line C-C in FIG. 18.
Figure 20:
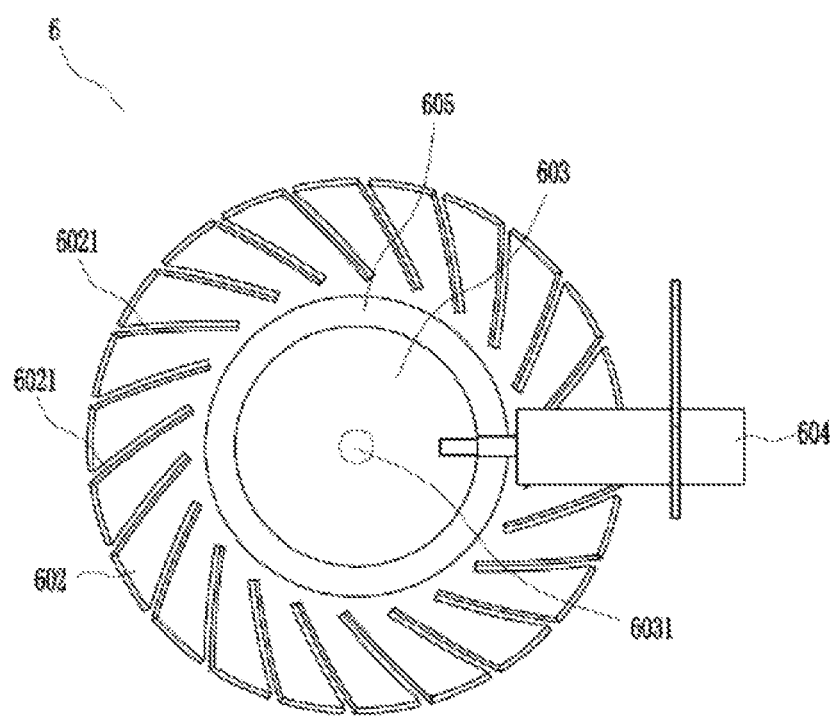
FIG. 20 is a top view of a start-up device.

As shown in FIGS. 16-17, the methanol-water mixture reforming hydrogen production generator further includes a heat exchange system 9, wherein the heat exchange system includes a co-axial double-layer heat exchange pipe 901, a normal temperature liquid inlet 902, a high temperature liquid outlet 903, a high temperature gas inlet 904 and a low temperature gas outlet 905. The inner-layer pipeline of the double-layer heat exchange pipe 901 is a gas pipeline 9011, and the outer-layer pipeline is a liquid pipeline 9012; at one end of the double-layer heat exchange pipe 901, the gas pipeline 9011 is in communication with the high temperature gas inlet 904, and the liquid pipeline 9012 is in communication with the high temperature liquid outlet 904; at the other end of the double-layer heat exchange pipe 901, the gas pipeline 9011 is in communication with the low temperature gas outlet 905, and the liquid pipeline 9012 is in communication with the normal temperature liquid inlet 902; in the hydrogen production process of the methanol-water mixture reforming hydrogen production generator, the methanol-water mixture feedstock in the hydrogen production feed branch pipe 406 enters the liquid pipeline 9012 by the normal temperature liquid inlet 902, the hydrogen produced by the hydrogen production system enters the gas pipeline 9011 by the high temperature gas inlet 904, the methanol-water mixture feedstock in the liquid pipeline 9012 and the hydrogen in the gas pipeline 9011 exchange heat thereof, the methanol-water mixture feedstock increases in temperature and is output to the reforming hydrogen production device 5 by the high temperature liquid outlet 903, and the hydrogen decreases in temperature and is output to the outside or to the fuel cell 7 by the low temperature gas outlet 905. By setting the heat exchange system, hydrogen can be cooled to a relative low temperature before entering into the fuel cell 7 and therefore does not cause damage to the fuel cell 7, and meanwhile methanol-water mixture feedstock entered into the reforming hydrogen production device 5 is heated in the heat exchanger, so as to reduce combustion heating intensity within the reforming hydrogen production device 5 and drastically improve utilization efficiency of the methanol-water mixture feedstock.

As shown in FIGS. 12, 14, 15 and 18-20, the start-up device 6 of the hydrogen production system includes a feed riser pipe 601, a flame tray 602, an upper cover body 603 and an igniter 604, the flame tray 602 and the upper cover body 603 are disposed on the riser pipe 601 from the bottom up; the middle part of the upper cover body 603 is provided with an aperture 6031 in communication with the riser pipe 601, the methanol-water mixture feedstock may flow from the feed riser pipe 601 up to the aperture 6031 and be exuded from the aperture and spread around along the upper side surface of the upper cover body 603 until flowing into the flame tray 602; an ignition position of the igniter 604 corresponds to the upper side surface of the upper cover body 603. Further, a lower cover body 605 is further provided between the flame tray 602 and the upper cover body 603, the lower cover body 605 can prevent methanol-water mixture feedstock in the flame tray 602 from sputtering outwardly. A plurality of vent holes 6021 are disposed on the periphery of the flame tray 602, so that external air enters though the vent holes 6021 into the flame tray 602 and the combustion chamber 503 in the reforming hydrogen production device 5. Preferably, the vent holes 6021 of the flame tray 602 are spiral vent hole grooves 6021, so that the flame combustion intensity can be increased, and the flame rises in a spiral-like shape, and spiral flame is more uniform and noise-free. Since the start-up device 6 employs a combination of the flame tray 602 and the upper cover body 603, methanol-water mixture feedstock can spread around on the upper side of the upper cover body 603, and can burn rapidly with large scale on the upper side of the upper cover body 603 after ignition, while unburned methanol-water mixture feedstock drops into the flame tray 602 for further burning with large scale. Thus, the start-up heat required by the reforming hydrogen production device is rapidly provided by the cooperation of the flame tray 602 and the upper cover body 603, so that the start-up speed of the hydrogen production system is very fast, and the system can normally start within 3 minutes.

As shown in FIGS. 1, 9 and 11-14, an air inlet device 12 is provided in forward direction of the flame tray 602. The air inlet device 12 includes an air inlet channel 121 and a blower 122, The blower 122 blows the external air first into the air inlet channel 121 and then into the flame tray 602 and the combustion chamber 503 of the reforming hydrogen production device 5.

Figure 1:
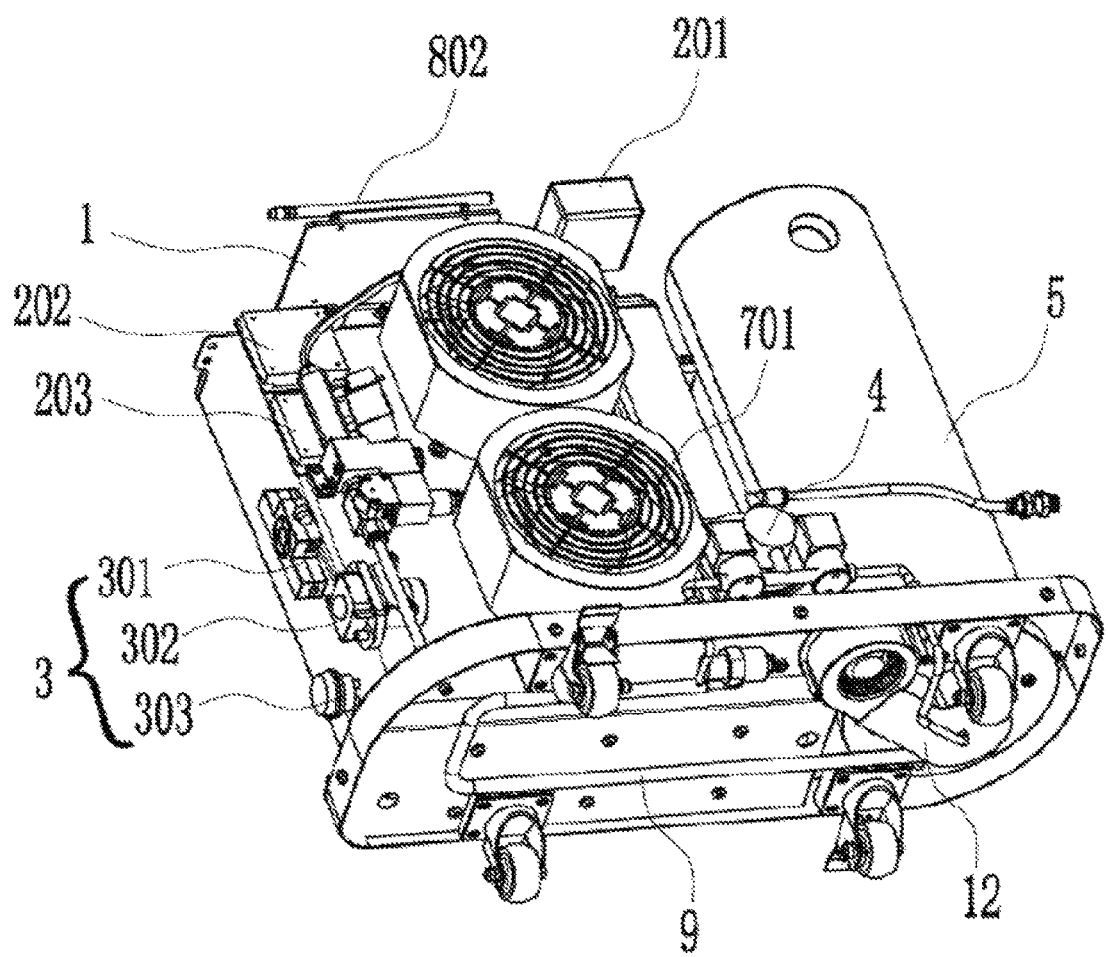
FIG. 1 is a schematic view of a stereostructure of a methanol-water mixture reforming hydrogen production generator (with a housing removed).
Figure 2:
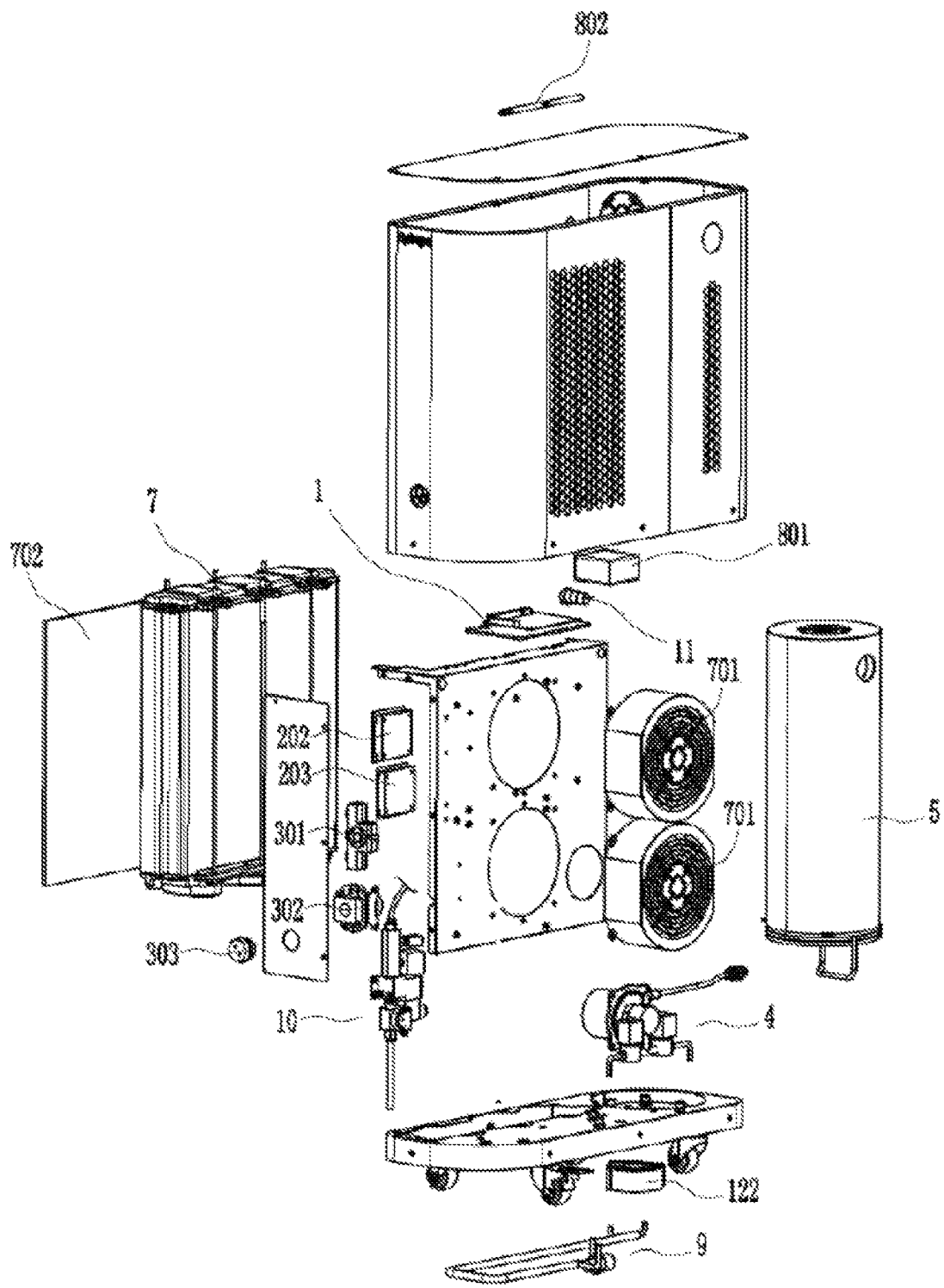
FIG. 2 is a schematic view of a dispersion structure of a methanol-water mixture reforming hydrogen production generator (with the housing removed).
Figure 3:
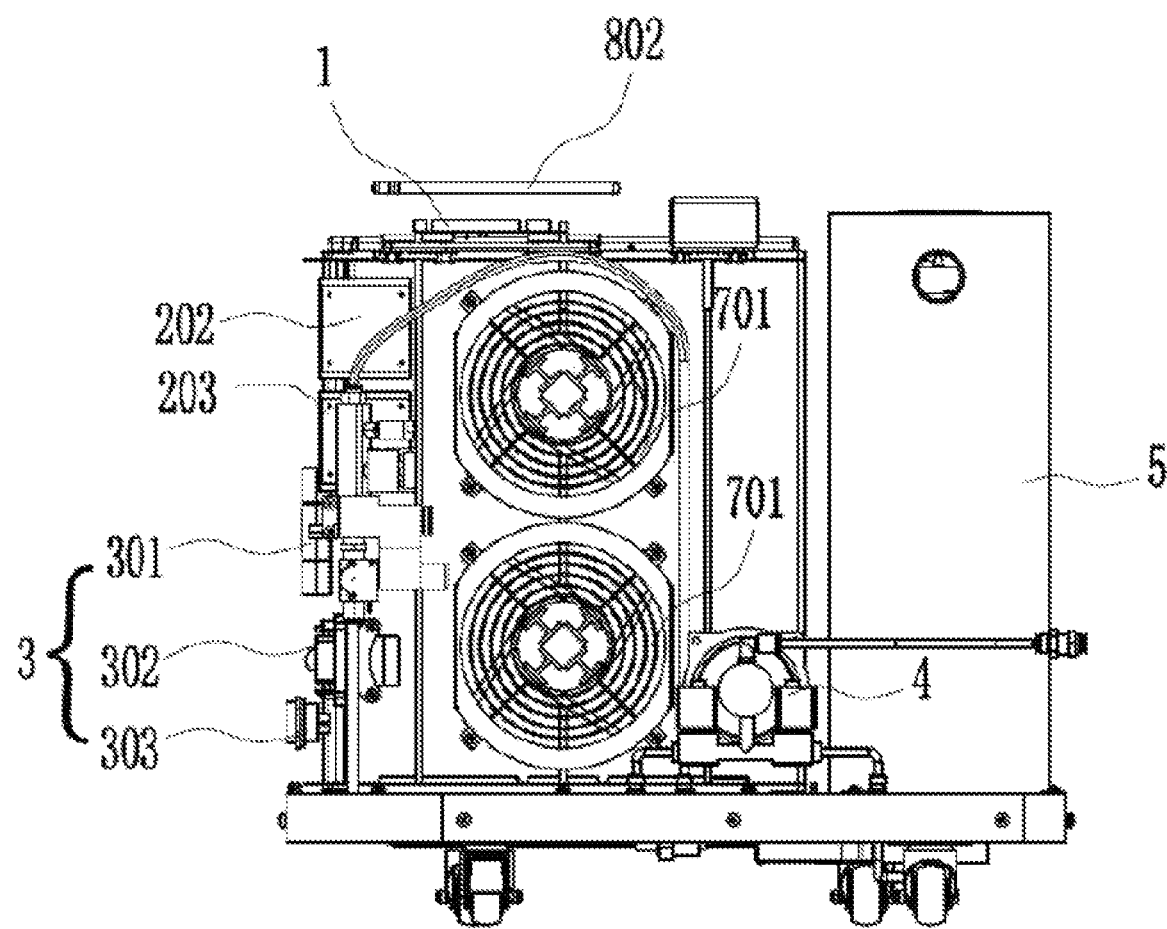
FIG. 3 is a front view of a methanol-water mixture reforming hydrogen production generator (with the housing removed).
Figure 4:
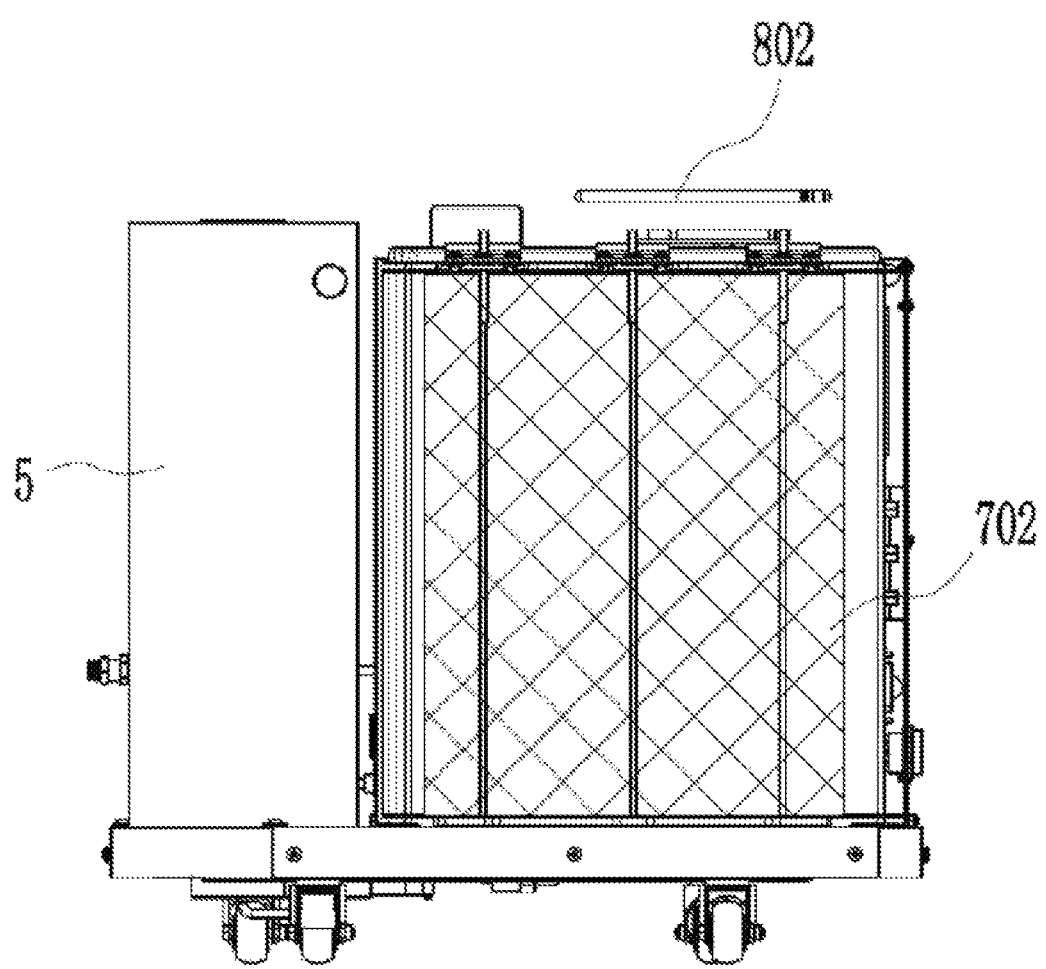
FIG. 4 is a rear view of a methanol-water mixture reforming hydrogen production generator (with the housing removed).
Figure 5:
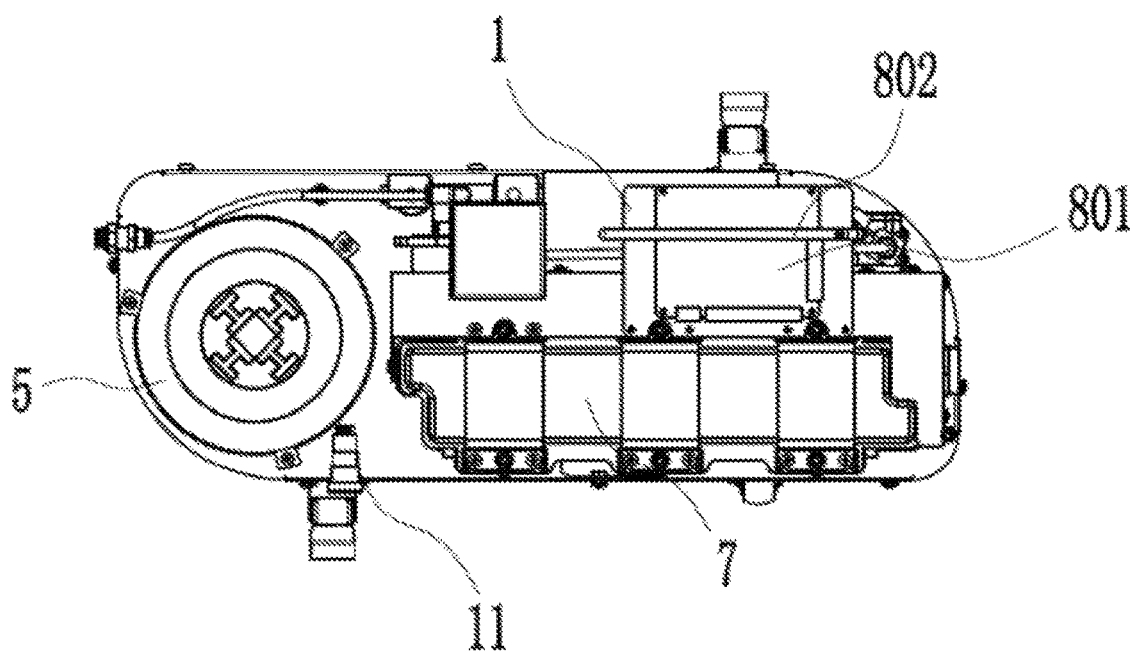
FIG. 5 is a top view of a methanol-water mixture reforming hydrogen production generator (with the housing removed).
Figure 21:
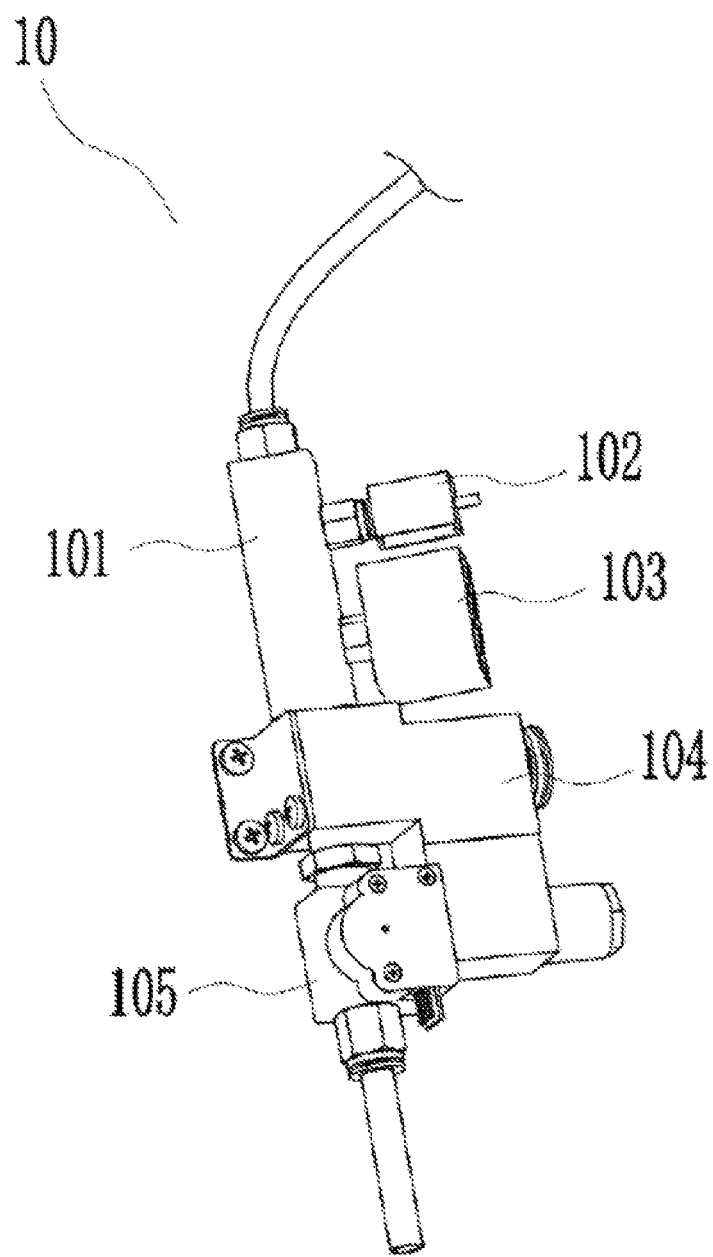
FIG. 21 is a schematic view of a stereostructure of a gas control system.

As shown in FIGS. 2, 7 and 21, the methanol-water mixture reforming hydrogen production generator further includes a gas control system 10 provided on a transfer pipeline used for transferring hydrogen to the fuel cell 7. The gas control system 10 includes a safety gas control pipe 101, a safety solenoid valve 102 and a safety air pressure sensor 103, and the safety solenoid valve 102 and the safety air pressure sensor 103 are mounted on the safety gas control pipe 101. The safety gas control pipe 101 has a gas release hole matched with the safety solenoid valve 102, and in a process that hydrogen passes through the safety gas control pipe 101, if the safety air pressure sensor 103 senses that a hydrogen pressure is higher than an alert pressure, the safety solenoid valve 102 is controlled to open the gas release hole, to discharge hydrogen to the outside. At this time, the control mainboard 1 controls an alarm (not shown) to generate an alarm. The safety solenoid valve 102 can be powered by the rechargeable battery 201, so as to ensure that the safe solenoid valve 102 is powered at any time. When the system has a problem in exhausting, the gas release hole of the safety gas control pipe 101 can be closed again by the safety solenoid valve 102. Because of the setting of the gas control system 10, problems of damage to devices such as the fuel cell 7 and the like by high hydrogen pressure caused by abnormality in the system are thereby avoided. Further, the gas control system 10 also includes a basic solenoid valve 104 and a basic air pressure sensor 105. The basic solenoid valve 104 is used to open and close hydrogen delivery channel under normal conditions. The basic air pressure sensor 105 is used to sense hydrogen pressure under normal conditions.

The contents stated above are only preferred embodiments of the present invention, and all the subtle modification, equivalent changes and embellishment of the above embodiments according to the technical schemes of the invention shall fall within the protection scope of the invention.

We claim:

1. A start-up system for starting a reforming hydrogen production device, the reforming hydrogen production device and the start-up system adopting methanol-water mixture as feedstock, and characterized by comprising: a feed riser pipe, a flame tray, an upper cover body and an igniter, wherein the flame tray and the upper cover body are disposed on the feed riser pipe from the bottom up; the middle part of the upper cover body is provided with an aperture in communication with the feed riser pipe, the methanol-water mixture feedstock flowing from the feed riser pipe up to the aperture and exuding from the aperture and spreading around along the upper side surface of the upper cover body until flowing into the flame tray; and an ignition position of the igniter corresponding to the upper side surface of the upper cover body.

2. The start-up system for starting the methanol-water mixture reforming hydrogen production device of claim 1, characterized in that a lower cover body is further provided between the flame tray and the upper cover body, wherein the lower cover body is mounted on the feed riser pipe, and is preventing the methanol-water mixture feedstock in the flame tray from sputtering outwardly.

3. The start-up system for starting the methanol-water mixture reforming hydrogen production device of claim 1, characterized in that a plurality of evenly arranged vent holes are disposed on the periphery of the flame tray, so that external air enters through the vent holes into the flame tray.

4. The start-up system for starting the methanol-water mixture reforming hydrogen production device of claim 3, characterized in that the vent holes are spiral grooves.

5. The start-up system for starting the methanol-water mixture reforming hydrogen production device of claim 1, characterized in that an air inlet device is provided below the flame tray, the air inlet device comprises an air inlet channel and a blower, the blower blows external air into the air inlet channel and then into the flame tray.

* * * * *